US006252613B1

(12) United States Patent
Borel et al.

(10) Patent No.: US 6,252,613 B1
(45) Date of Patent: Jun. 26, 2001

(54) MATRIX DISPLAY ADDRESSING DEVICE

(75) Inventors: Thierry Borel, Chantepie; Antoine Dupont, Strasbourg; Stéphane Garnier, Chantepie; Benoît Le Ludec, Cesson-Sévigné; Jean-Claude Lehureau, Ste Geneviève des Bois, all of (FR)

(73) Assignee: Thomson Multimedia, S.A., Boulogne-Billancourt (FR)

( * ) Notice: Subject to any disclaimer, the term of this patent is extended or adjusted under 35 U.S.C. 154(b) by 0 days.

(21) Appl. No.: 09/077,379

(22) PCT Filed: Dec. 18, 1996

(86) PCT No.: PCT/FR96/02013

§ 371 Date: May 27, 1998

§ 102(e) Date: May 27, 1998

(87) PCT Pub. No.: WO97/23861

PCT Pub. Date: Jul. 3, 1997

(30) Foreign Application Priority Data

Dec. 22, 1995 (FR) ..................................................... 95 15405

(51) Int. Cl.$^{7}$ ....................................................... G06F 13/16

(52) U.S. Cl. ........................... 345/521; 345/515; 345/510

(58) Field of Search ..................................... 345/186, 188, 345/507–510, 515, 513, 521, 55, 87, 90, 98; 348/714–721, 659–663, 459

(56) References Cited

U.S. PATENT DOCUMENTS

| | | | | |
|---|---|---|---|---|
| 4,792,856 | * | 12/1988 | Shiratsuchi | 348/561 |
| 4,985,698 | | 1/1991 | Mano et al. | 340/784 |
| 5,053,863 | * | 10/1991 | Ohtsuka | 348/717 |
| 5,444,497 | | 8/1995 | Takeuchi | 348/719 |
| 5,841,480 | * | 11/1998 | Rhodes | 348/459 |

FOREIGN PATENT DOCUMENTS

| | | | |
|---|---|---|---|
| 3634092 A1 | 4/1988 | (DE) | H04N/5/14 |
| 0368572 | 5/1990 | (EP) | G09G/3/36 |
| 0428324 | 5/1991 | (EP) | G09G/3/20 |

* cited by examiner

*Primary Examiner*—Kee M. Tung
(74) *Attorney, Agent, or Firm*—Joseph S. Tripoli; Harvey D. Fried; Sammy S. Henig

(57) ABSTRACT

A device for addressing a matrix screen such as a screen of the LCD or plasma type having a memory stage receiving, via a demultiplexing stage a plurality of sequences of digital data representing the previously digitized luminance video signals, and delivering the luminance video signals to a multiplexing stage designed to select a sequence of digital data corresponding to a given combination of subpixels from amongst the plurality of sequences of digital data previously stored in the memory stage.

6 Claims, 11 Drawing Sheets

MATRIX DISPLAY ADDRESSING DEVICE

FIELD OF THE INVENTION

BACKGROUND OF THE INVENTION

The present invention concerns a device for addressing a matrix screen such as a screen of the LCD or plasma type.

The display surfaces of such screens generally have a plurality of subpixels P(i,j) representing one of the primary colours R, G or B and addressed through a crossed network of N horizontal rows and M vertical columns, each subpixel receiving, through a switch which connects it to the adjacent column, during the addressing phase (line time), a sampled video signal.

The spatial resolution of such screens depends on the number and mode of combinations of addressable subpixels used to produce displayable pixels, whose successive sequences constitute the video rows and columns of the image to be displayed.

FIG. 1 illustrates a known mode of combining subpixels, referred to as L mode, use for addressing an orthogonal screen and consisting of producing a displayable pixel by combining three subpixels R, G and B situated on the same row. In this case, the horizontal resolution, denoted Hr, is equal to M/3, and is small compared with the vertical resolution, denoted Hv, whose value is equal to N. This is because the design of a VGA screen of 480 rows and 640 columns using the L combination mode requires a number of columns M equal to 640*3=1920, and a number of rows N equal to 480. In addition, in order to respect the format of the image, this combination mode requires a high number of subpixels, which appreciably increases the cost of the screen.

Moreover, insofar as matrix screens can be addressed only in progressive mode, the combination mode described in FIG. 1 requires the use of an algorithm for adapting the screen to a source of interlaced images.

FIGS. 2 and 3 illustrate respectively a first variant and a second variant of a second known mode of combining subpixels, referred to as Delta mode, used for addressing a screen of the DELTA type. Like the L mode, a displayable pixel is obtained by combining three subpixels R, G and B situated on the same horizontal row. However, in the first variant of the Delta mode, depicted in FIG. 2, two successive rows are offset horizontally with respect to each other by half a subpixel, whilst in the second variant, depicted in FIG. 3, two successive rows are offset horizontally with respect to each other by one and a half subpixels. As a result, in the first case, a column of displayable pixels has a width equal to three and a half times the width of a subpixel whilst in the second case a column of displayable pixels has a width equal to four and a half times that of a subpixel. In the first case, the horizontal resolution is reduced in a proportion of three and a half times with respect to the vertical resolution, whilst in the second case the horizontal resolution is reduced in a proportion of four and a half times with respect to the vertical resolution.

SUMMARY OF THE INVENTION

The aim of the invention is to produce a device for addressing a matrix screen enabling the horizontal resolution to be improved without excessively degrading the vertical resolution.

The device according to the invention has a memory stage 70 and 198 receiving, via a demultiplexing stage 220, a plurality of sequences of digital data representing the previously stored luminance video signals and delivering the said luminance video signals to a multiplexing stage 230 designed to select a sequence of digital data corresponding to a given combination of subpixels from amongst the plurality of sequences of digital data previously stored in the said memory stage 70 and 198.

Thus the device according to the invention enables a combination of subpixels to be selected making it possible to obtain a better compromise between the vertical resolution and horizontal resolution whatever the type of screen used.

BRIEF DESCRIPTION OF THE DRAWINGS

Other characteristics and advantages of the invention will emerge from the description which follows, taken by way of non-limitative example, with reference to the accompanying figures in which.

DETAIL DESCRIPTION OF THE INVENTION

Figure 10:
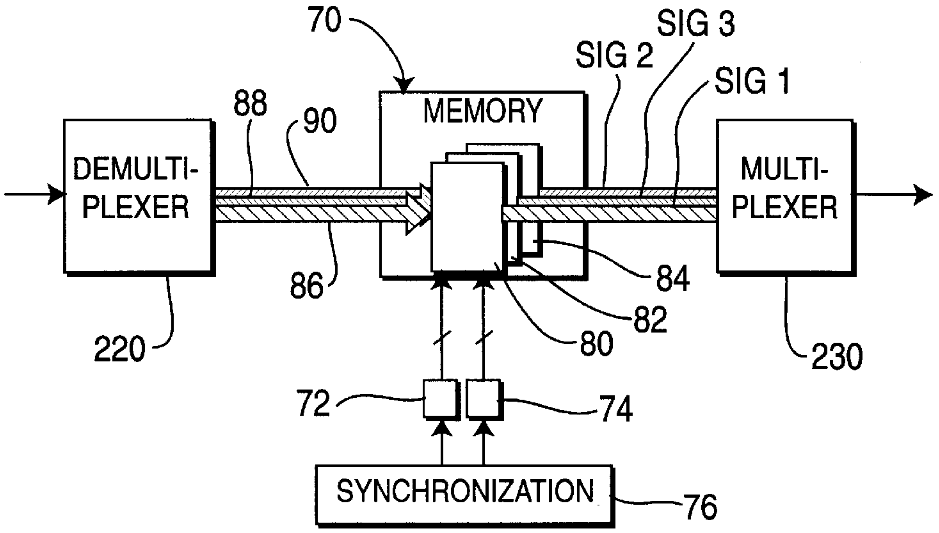
FIG. 10 depicts partially a first embodiment of an addressing device according to the invention.
Figure 11:
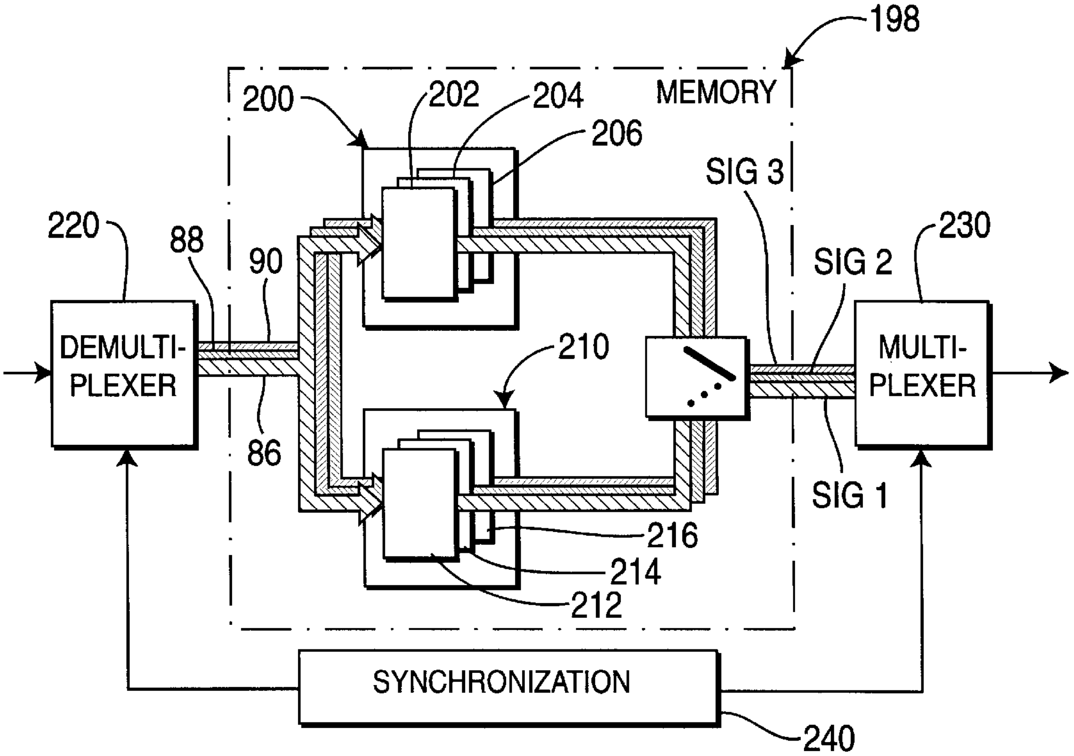
FIG. 11 depicts partially a second embodiment of an addressing device according to the invention.

FIG. 10 illustrates diagrammatically a device for addressing a matrix screen whose surface has a plurality of subpixels R, G and B each receiving a luminance video signal. These pixels are distributed over the surface of the screen in a network of N physical rows and M physical columns at the intersections of which are arranged switches such as TFTs (Thin Film Transistors) in the case of LCD screens. These switches make it possible, during the addressing phase, to connect the addressed pixels to the physical columns.

According to the invention, the addressing device has a memory stage 70 and 198 receiving, via a demultiplexing stage 220, a plurality of sequences of digital data representing the previously stored luminance video signals and delivering the said luminance video signals to a multiplexing stage 230 designed to select a sequence of digital data corresponding to a given combination of subpixels from amongst the plurality of sequences of digital data previously stored in the said memory stage 70 and 198.

According to a first embodiment of the addressing device according to the invention, the memory stage 70 has a first memory 80 dedicated to the storage of the digital data resulting from the sampling of the signals sent to the subpixels R, a second memory 82 dedicated to the storage of the digital data resulting from the sampling of the signals sent to the subpixels G and a third memory 84 dedicated to the storage of the digital data resulting from the sampling of the signals sent to the subpixels B. In this embodiment, the memory stage 70 is connected on the one hand to a means 72 of controlling the writing of the digital data to the memories 80, 82 and 84 and on the other hand to a means 74 of controlling the reading of the said data from memories 80, 82 and 84, the said write control means 72 and read control means 74 are connected to a first means 76 of synchronizing the writing and reading phases.

According to this embodiment, each of the memories 80, 82 and 84 has two distinct areas, that is to say a first area 102 in which the digital data relating to the subpixels R, G and B of a given video row during a given writing phase, and a second area 104 from which there are read, during the said writing phase, the digital data relating to the subpixels R, G and B of a video row written during the previous writing phase.

According to a second embodiment of the addressing device according to the invention, the memory stage 198 has two parallel arms, that is to say a first arm in which is arranged a unit 200 having at least three FIFO cells, that is to say a first cell 202, a second cell 204 and a third cell 206 intended respectively to contain the video data relating to the subpixels R, G and B situated on one of the physical rows constituting an even video row, and a second arm in which is arranged a unit 210 also including at least three FIFO cells, that is to say a fourth cell 212, a fifth cell 214 and a sixth cell 216 intended respectively to contain the video data relating to the subpixels R, G and B situated on one of the physical rows constituting an odd video row.

In this embodiment, the demultiplexing stage 220 switches on the one hand the data relating to the subpixels R, G and B belonging to the odd video columns to the unit 200 so as to write the said data, during a phase of writing a video row of duration D, respectively to the first cell 202, the second cell 204 ar the third cell 206, and on the other hand the data relating to the subpixels R, G and B belonging to the even video columns to the unit 210, so as to write the said data, during the writing phase, respectively to the fourth cell 212, the fifth cell 214 and the sixth cell 216.

According to this second embodiment, a second synchronization means 240 is connected on the one hand to the demultiplexing stage 220 and delivers to this stage 220 a first periodic signal OW of frequency F controlling the writing of the video data relating to the subpixels R, G and B situated on an odd video column respectively to the first cell 202, to the second cell 204 and to the third cell 206, and a second periodic signal EW of frequency F controlling the writing of the video data relating to the subpixels R, G and B situated on an even video column respectively to the fourth cell 212, to the fifth cell 214 and to the sixth cell 216. This second synchronization means 240 is connected on the one hand to the multiplexing stage 230 and delivers to this stage 230 a third periodic signal RD of frequency 2*F controlling the reading of the video data relating to the subpixels of an even (or respectively odd) video row selected by the multiplexing stage 230.

The multiplexing stage 230 selects, at a frequency 1/D, from a date coinciding with half the duration D, a sequence of data representing the subpixels belonging to a video row to be displayed which were previously stored in one of the cells 202, 204, 206, 212, 214 or 216.

Figure 12:
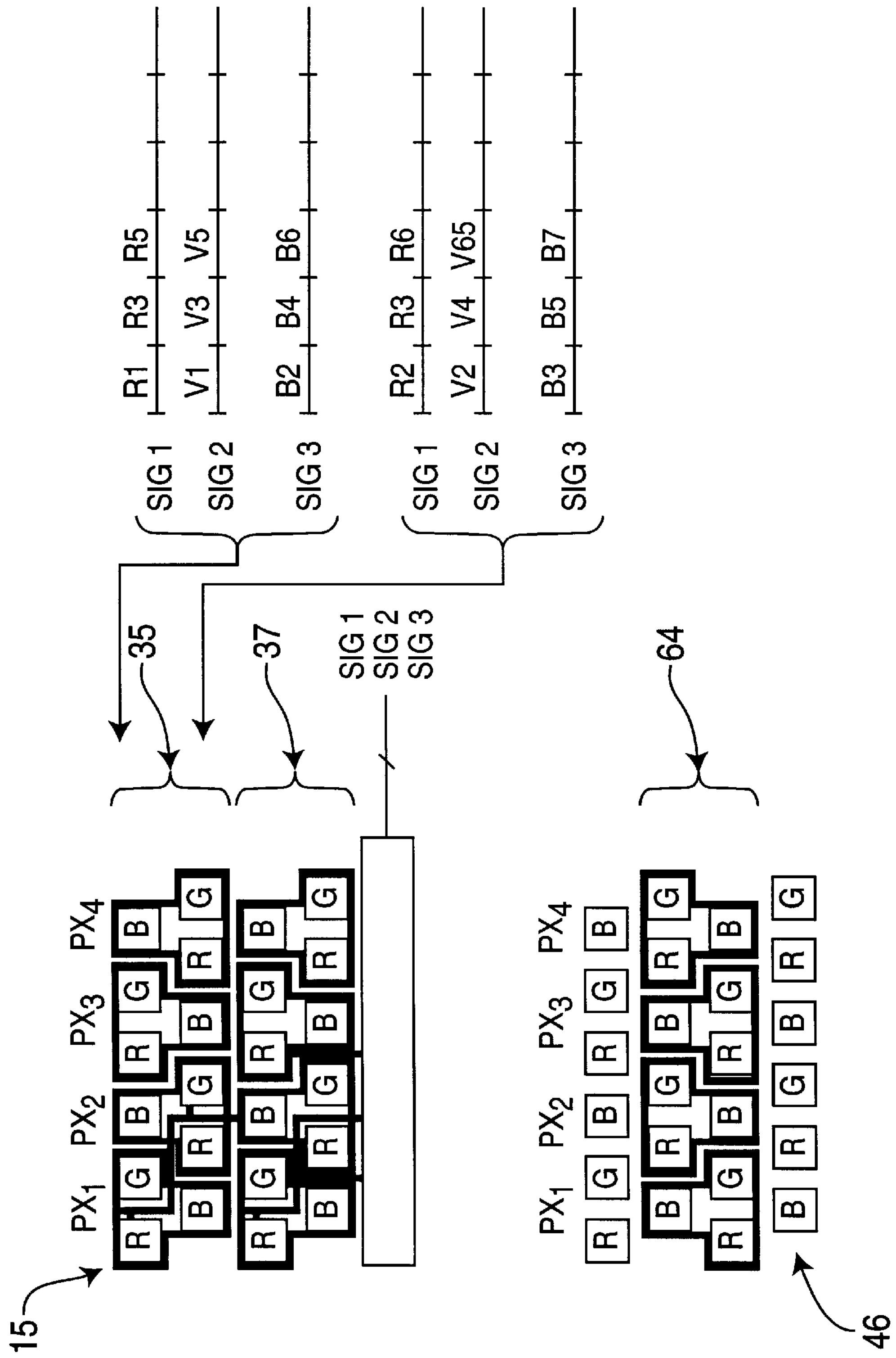
FIGS. 12 to 14 depict explanatory diagrams of the operation of the addressing device of FIG. 10.
Figure 13:
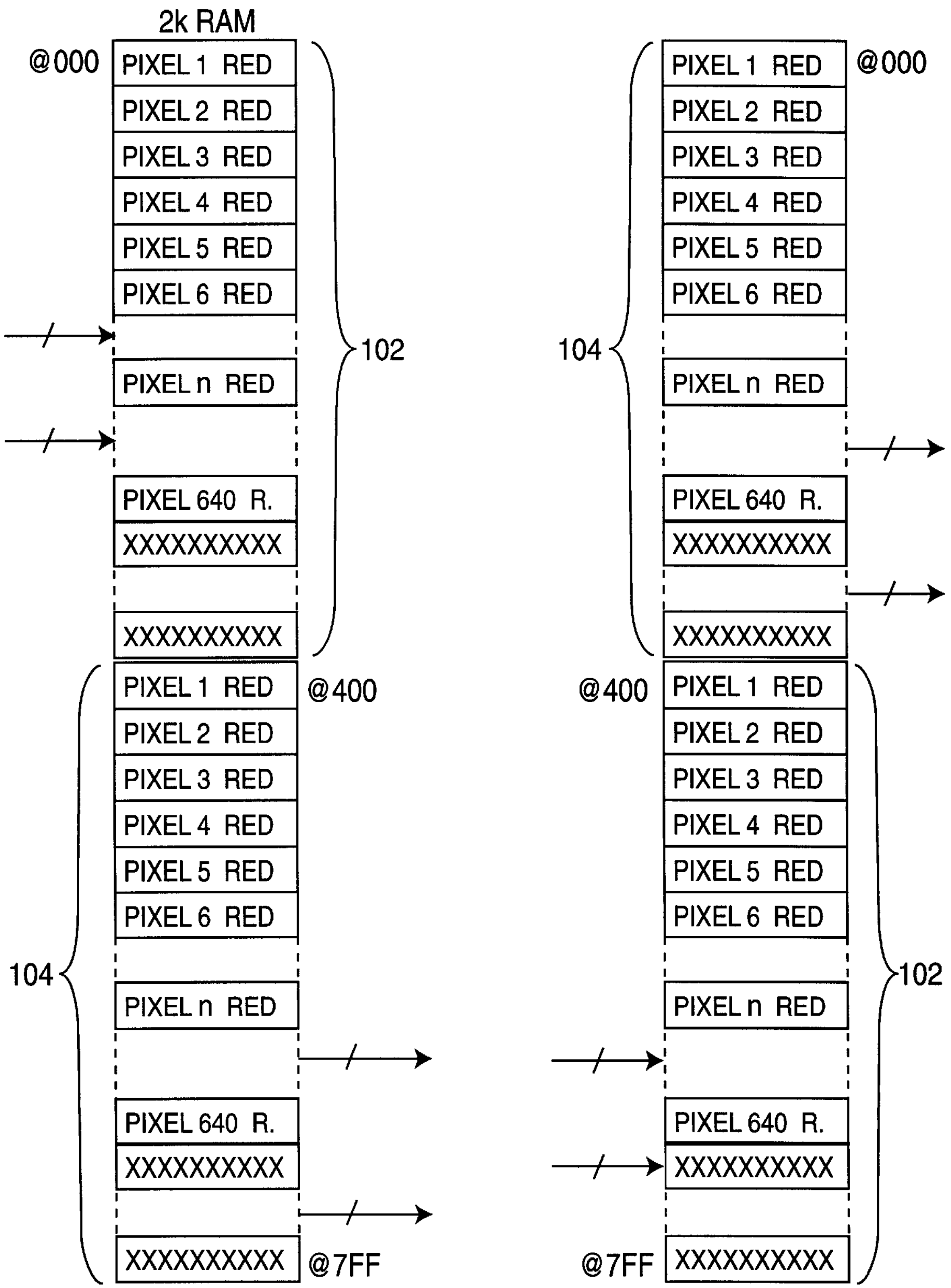

FIG. 12 illustrates an example of the addressing of a screen of the Delta type, partially depicted, by means of a device according to the invention. The successive pixels PXk (k=1, 2, 3, etc.) of the video rows 35, 37 and 64 are designated according to their respective spatial positions, indicated by the index k. Each pixel is formed by combining three subpixels Rk, Gk and Bk. The signals SIG1, SIG2, SIG3 represent the samples of the luminance signals sent respectively to the subpixels Rk, Gk and Bk, situated on the same video column. Thus the subpixels of the physical row Li receive respectively three sequences SIG1, SIG2, SIG3 including respectively the samples R1, R3, R5, . . . , G1, G3, G5, . . . , and B2, B4, B6, . . . , whilst the subpixels of the physical row Li+1 receive respectively three sequences SIG1, SIG2, SIG3 including respectively the samples R2, R4, R6, . . . , G2, G4, G6, . . . and B3, B5, B7.

Figure 14:
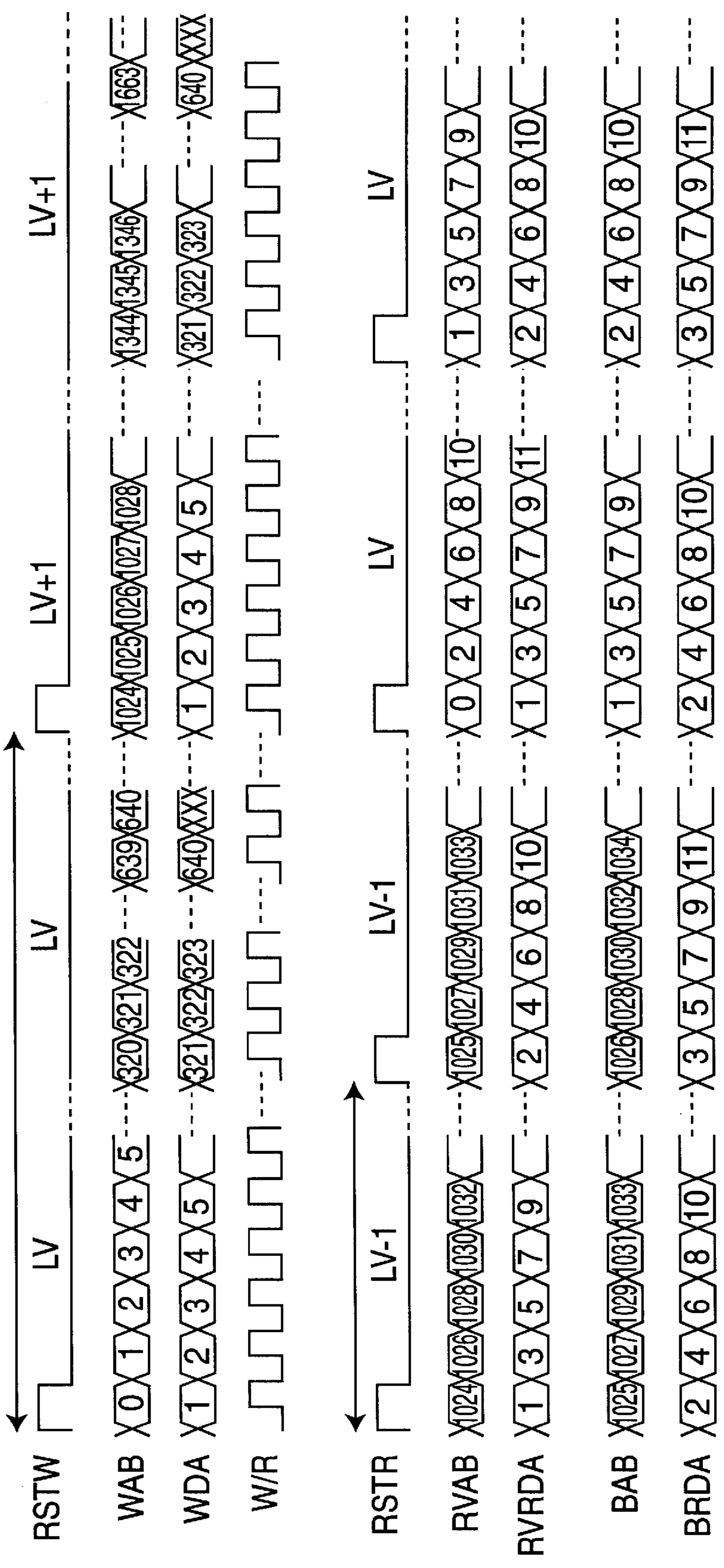

FIG. 14 illustrates the phase during which there takes place on the one hand the writing of the data relating to the subpixels R, G and B of a video row LV and on the other hand the reading of the data relating to the subpixels R, G and B of the previous video row LV−1, and then the following phase, during which there takes place on the one hand the writing of the data relating to the subpixels R, G and B of a video row LV+1 and on the other the reading of the data relating to the subpixels R, G and B of the video row LV written during the previous phase.

As explained previously, the writing of the said video row LV and the reading of the said video row LV−1 take place simultaneously and are synchronized by the first synchronization means 76, which sends to the write control means 72 and to the read control means 74 a signal W/R, depicted in FIG. 14, making it possible on the one hand to progressively write the video data relating to the subpixels R, G and B and on the other hand to read the said data correlatively at the respective spatial positions of each of the subpixels R, G and B on the screen.

The writing phase for the row LV is illustrated by the lines RSTW, WAB, WDA and W/R whilst the reading phase for the row LV−1 is illustrated by the lines RSTR, RVAB, RBRDA, BDA and BRDA.

The line RSTW represents a signal initializing the write phase, the line WAB represents the successive addresses in the memories 80, 82, 84 in which there will be stored successively the digital data representing the samples Rk, Gk and Bk. The line WDA represents the said digital data transported respectively by data buses 86, 88, 90. The line W/R represents the signal synchronizing the successive write and read phases sent by the first synchronization means 76. The line RSTR represents a signal initializing the read phase. The line RVAB represents the successive addresses in the memories 80, 82 and 84 in which the digital data representing the samples Rk, Gk are already stored. The line RVRDA represents the data Rk, Gk read respectively on data buses 94 and 96. The line BAB represents the successive addresses in the memories 80, 82 and 84 in which there are already stored the digital data representing the samples Bk, the line BRDA the data Bk read on the bus 92.

The data Rk, Gk and Bk depicted on the line WDA are written progressively, whilst the data RVRDA and BRDA, previously written, are read correlatively at their respective positions on the surface of the screen.

Figure 15:
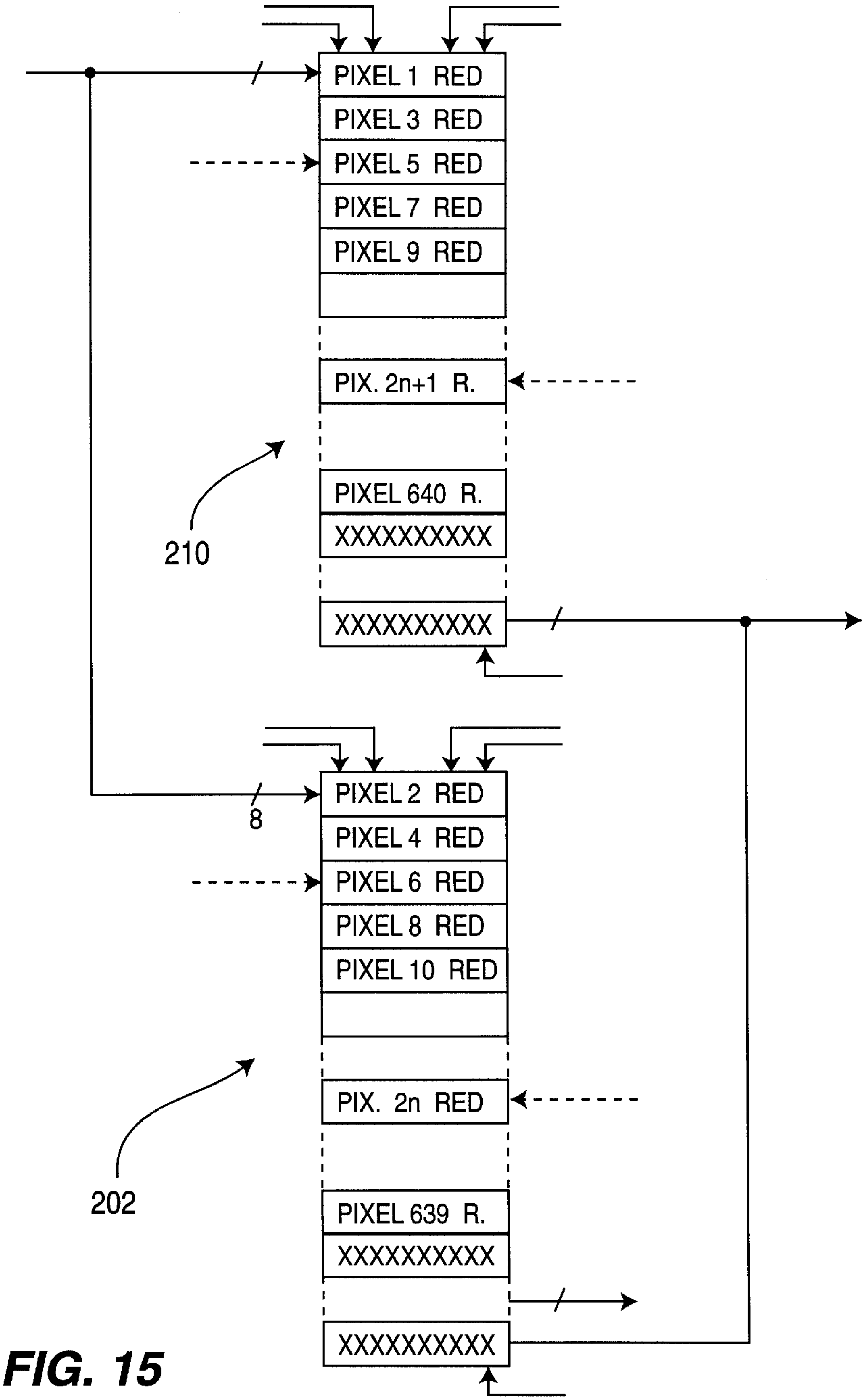
FIGS. 15 and 16 depict explanatory diagrams of the operation of the addressing device of FIG. 11.
Figure 16:
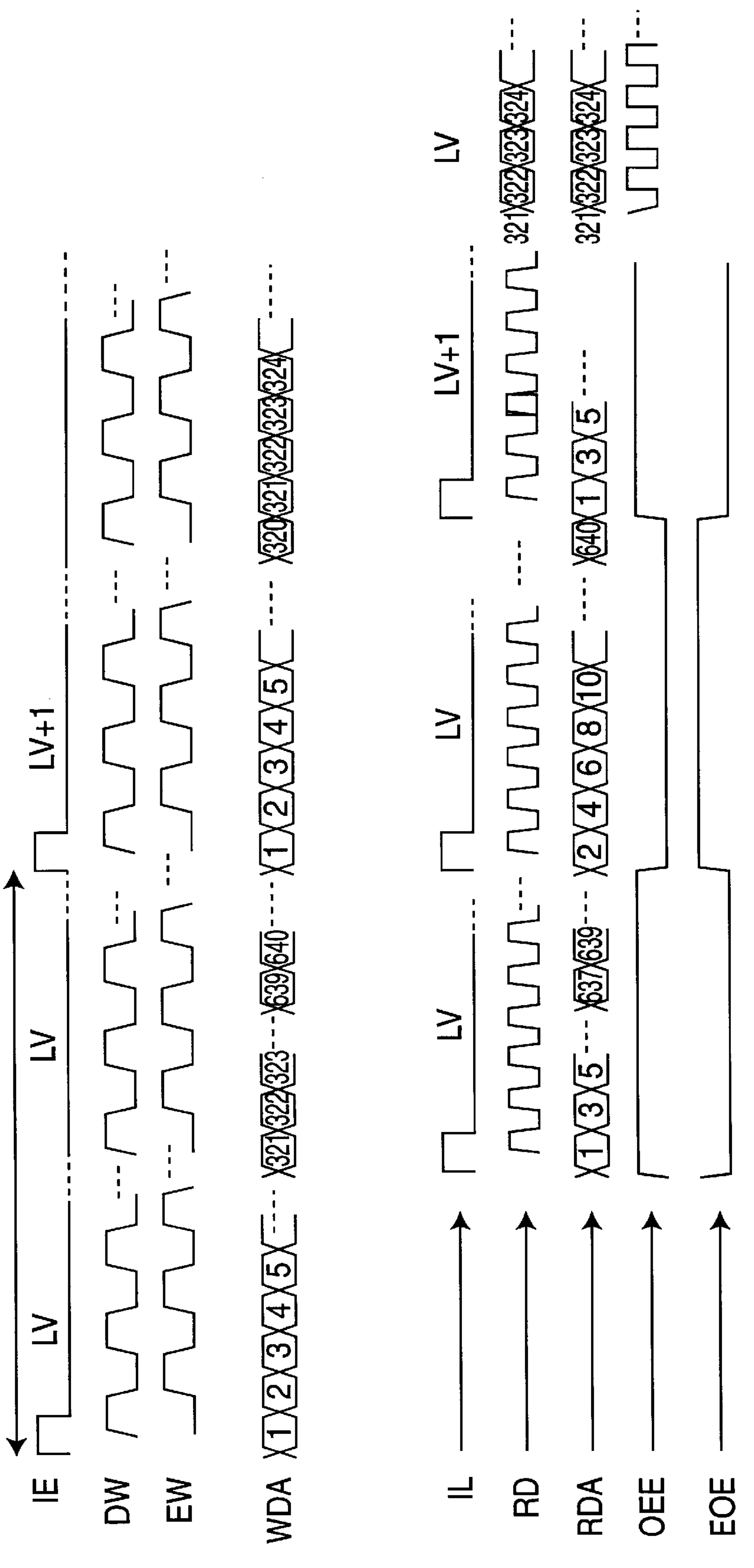

FIG. 15 illustrates partially a cell 202 and a cell 210, and FIG. 16 illustrates the phase during which there takes place on the one hand the writing of the data relating to the subpixels R, G and B of a video row LV, and on the other hand the phase during which there takes place the reading of the data relating to the subpixels R, G and B of the said video row LV previously written in the cells 202 and 210, then the phase during which there takes place on the one hand the writing of the data relating to the subpixels R, G and B of the video row LV+1 and on the other hand the phase during which there takes place the reading of the data relating to the subpixels R, G and B of the said video row LV+1, previously written in the cells 202 and 210. Synchronization of the said writing and reading phases is effected by means of a second synchronization means 240 supplying, on the one hand, to the demultiplexing stage 220 a first periodic signal OW of frequency F controlling the writing of the video data relating to the subpixels R, G and B situated on an odd video column respectively to the cells 202, 204 and 206, and a second periodic signal EW of frequency F controlling the writing of the video data relating to the subpixels R, G and B situated on an odd video column respectively to the cells 212, 214 and 216, and, on the other hand, to the multiplexing stage 230, a third periodic signal RD of frequency 2*F controlling the reading of the video data relating to the subpixels of an even (or respectively odd) video column selected by the multiplexing stage 230.

In FIG. 16, the line IE represents a signal initializing the writing phase, the line OW represents the signal controlling the writing of the video data relating to the subpixels R, G and B situated on an odd video column, the line EW represents the signal controlling the writing of the video data relating to the subpixels R, G and B situated on an odd video column, the line WDA represents the digital data to be written to the cells 202 and 210, the line IL represents a signal initializing the reading phase, the line RDA represents the data read, the line OEE represents a signal selecting the data relating to the subpixels R, G and B situated on an odd video column, the line EOE represents a signal selecting the data relating to the subpixels R, G and B situated on an odd video column. As can be seen on the lines OW, the writing to the cell 202 of the video data relating to the subpixels R, G and B situated on an odd video column is synchronized on each rising edge of the signal OW. Likewise, the writing, to the cell 210, of the video data relating to the subpixels R, G and B situated on an odd video column is synchronized on each rising edge of the signal EW. The signal RD enabling the reading of the digital data at a frequency twice that of the signals OW and EW. Consequently, in order to synchronize, with the frequency of a video row, the total duration of the phases of reading the data relating to the subpixels R, G and B situated on an odd video column and those relating to the subpixels R, G and B situated on an even video column, the said reading phases start when the cells 202 and 212 are half full. Thus, in the example of FIG. 16, the odd data are read at each rising edge of the signal RD as from a moment coinciding with the writing of the 321th data item, situated in this example at half the cell 202, and when the signal OEE has a logic high level. At the same time the even data are read at each rising edge of the signal RD at a moment coinciding with the writing, to the cell 212, of the 321th data item when the signal OEO has a logic high level.

FIGS. 4 to 9 illustrate a combination of subpixels in which two physical rows Li and Li+1 are used to constitute a video row of the image to be displayed, and the said image is broken down into an odd raster 9, 11, 13, 15, 17, 19 and 20 comprising odd video rows 21, 23, 25, 27, 29, 31, 33, 35, 37, 39, 41, 43, 45, 47 and 49, and an even raster 40, 42, 44, 46, 48, 50 and 52 comprising even video rows 54, 56, 58, 60, 62, 64, 65, 66, 67 and 68, the said odd and even rasters being offset with respect to each other by one physical row, so as to allow an interlacing of the odd video rows with the even video rows.

As can be seen in each of FIGS. 4 to 8, the physical rows Li used to form the even video rows 54, 56, 58, 64, 65 and 67 are also used for forming the physical rows Li+1 of the respective odd video rows 21, 25, 29, 35, 39 and 43. This produces an interlacing of the said even video rows and odd video rows.

According to a first example application of the addressing device according to the invention illustrated by FIGS. 4 to 7*b* and 9, the multiplexing stage 220 selects the sequences of digital signals relating to two contiguous subpixels situated on the physical row Li (respectively Li+1) and to a subpixel situated on the physical row Li+1 (respectively Li), and then the sequences of digital signals relating to a subpixel situated on the row Li (respectively Li+1) and to two subpixels situated on the row Li+1 (respectively Li) to-address a pixel of a video row of the image to be displayed.

Figure 8:
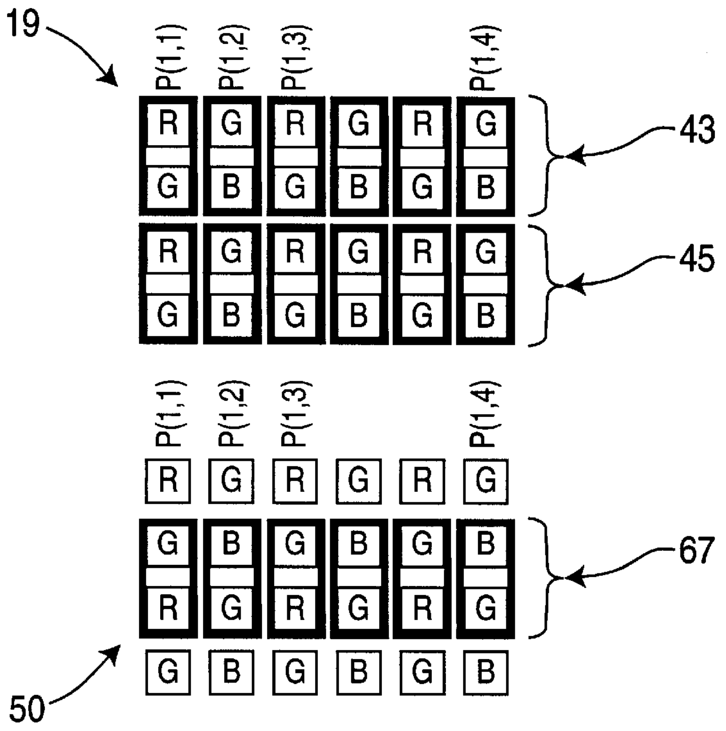
FIG. 8 illustrates partially a second mode of combining the subpixels R, G and B implemented by an addressing device according to the invention applied to a matrix screen of the orthogonal type.

According to a second example application of the addressing device according to the invention illustrated by FIG. 8, the multiplexing stage 220 selects the sequences of digital signals relating to a first subpixel situated on the physical row Li and the sequences of digital signals relating to a second subpixel adjacent to the first subpixel and situated on the physical row Li+1 in order to address a pixel of the video row 43 and 45 (respectively 67).

This combination mode is particularly suited to uses which do not require good colorimetry but rather require good fineness of detail, insofar as on the one hand it makes it possible to triple the horizontal resolution with respect to the combination modes of the prior art described previously, and on the other hand it causes spectral bending known as coloured aliasing producing irisation of the details of the image displayed.

Sampling of the video signals sent to the combined subpixels is effected either simultaneously, or in spatial mode, that is to say at different instants corresponding to the respective positions of the said subpixels on the surface of the screen.

Thus, designating the relative positions of the subpixels on the physical rows and columns of the matrix screen respectively i and j, for j varying periodically from 1 to M, and for two given physical rows Li and Li+1 situated on the odd raster 19, in a first example of addressing, there are sampled:

- the video signals sent to the subpixels p(i,j) and p(i+1,j) representing respectively the primary colours R and G for constituting the first displayable pixels of the odd video row 43 and 45, then the video signals sent to the subpixels p(i,j+1) and p(i+1,j+1) representing respectively the primary colours G and B for constituting the second displayable pixels of the said odd video rows 43 and 45, and for two given physical rows Li and Li+1 situated on the even raster 50, there are sampled:
- the video signals sent to the subpixels p(i,j) and p(i+1,j) representing respectively the primary colours G and R for constituting the first displayable pixel of the even video row 67, then the video signals sent to the subpixels p(i,j+1) and p(i+1,j+1) representing respectively the primary colours B and G constituting the second displayable pixel of the said even video row 67.

Figure 1:
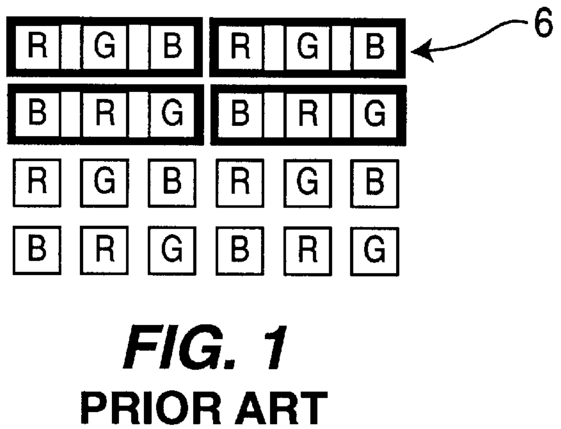
FIG. 1 PRIOR ART
FIG. 1 illustrates partially a first mode of combining subpixels R, G and B of a matrix screen of the orthogonal type, used in the prior art.
Figure 2:
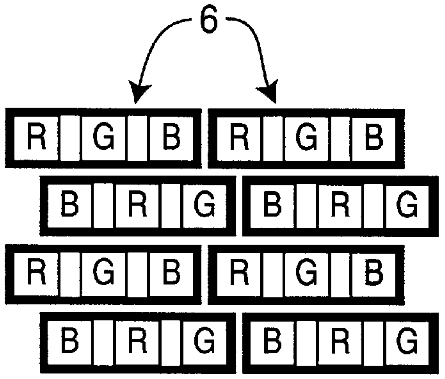
FIG. 2 PRIOR ART
FIGS. 2 and 3 illustrate an application of the subpixel combination mode of FIG. 1 to a screen of the Delta type.
Figure 3:
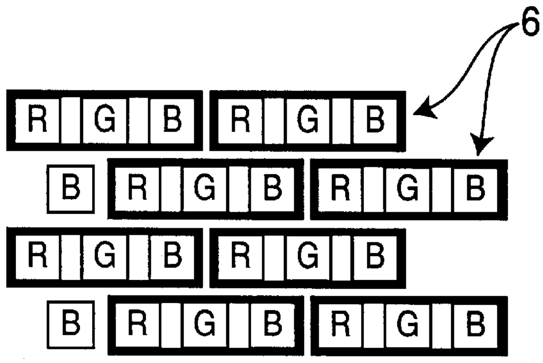
FIG. 3 PRIOR ART
Figure 4:
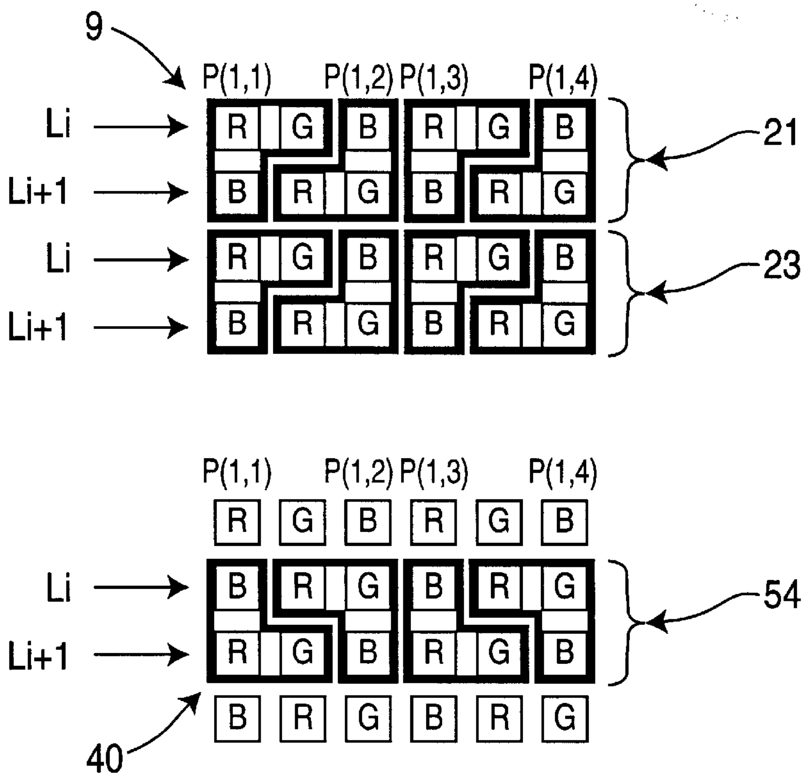
FIG. 4 illustrates partially a first mode of combining the subpixels R, G and B of a matrix screen produced by an addressing device according to the invention applied to a screen of the orthogonal type.

In a second example of addressing, applied to a screen of the orthogonal type, illustrated by FIG. 4, for j varying periodically from 1 to M in steps of 3, and for given two physical rows Li and Li+1 situated on the odd raster 9, there are sampled:

the video signals sent to the subpixels p(i,j), p(i,j+1) and p(i+1,j) representing respectively the primary colours R, G and B for constituting the first displayable pixel of the odd video row 21 and 23, then the video signals sent to the subpixels p(i,j+2), p(i+1,j+1) and p(i+1,j+2) representing respectively the primary colours B, R and G for constituting the following pixel of the said odd video row 21 and 23, and for two given physical rows Li and Li+1 situated on the odd raster 40, there are sampled:

the video signals sent to the subpixels p(i,j), p(i+1,j), p(i+1,j+1) representing respectively the primary colours B, R and G for constituting the first displayable pixel of the odd video row 54, then the video signals sent to the subpixels p(i,j+1), p(i,j+2) and p(i+1,j+2) representing respectively the primary colours R, G and B for constituting the following pixel of the said even video row 54.

Figure 5:
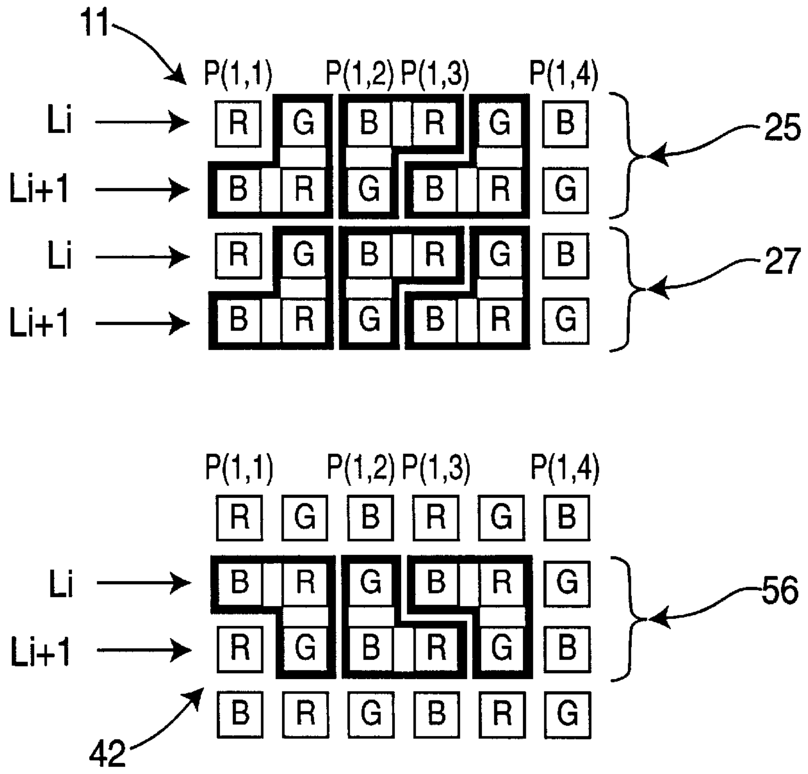
FIG. 5 illustrates partially a first variant of the mode of combining the subpixels R, G and B illustrated in FIG. 4.

In a third example of addressing, applied to a screen of the orthogonal type, illustrated by FIG. 5, for j varying periodically from 1 to M in steps of 3, and for two given physical rows Li and Li+1 situated on the odd raster 11, there are sampled:

the video signals sent to the subpixels p(i,j+1), p(i+1,j) and p(i+1,j+1) representing respectively the primary colours R, G and B for constituting the first displayable pixel of the odd video row 25 and 27, then the video signals sent to the subpixels p(i,j+2), p(i,j+3) and p(i+1,j+2) representing respectively the primary colours B, R and G for constituting the following pixel of the said odd video row 25 and 27, and for two given physical rows Li and Li+1 situated on the odd raster 42, there are sampled:

the video signals sent to the subpixels p(i,j), p(i+1,j), p(i+1,j+1) representing respectively the primary colours B, R and G for constituting the first displayable pixel of the odd video row 56, then the video signals sent to the subpixels p(i,j+2), p(i+1,j+2) and p(i+1,j+3) reperesenting respectively the primary colours G, B and R for constituting the following pixel of the said even video row 56.

Figure 6:
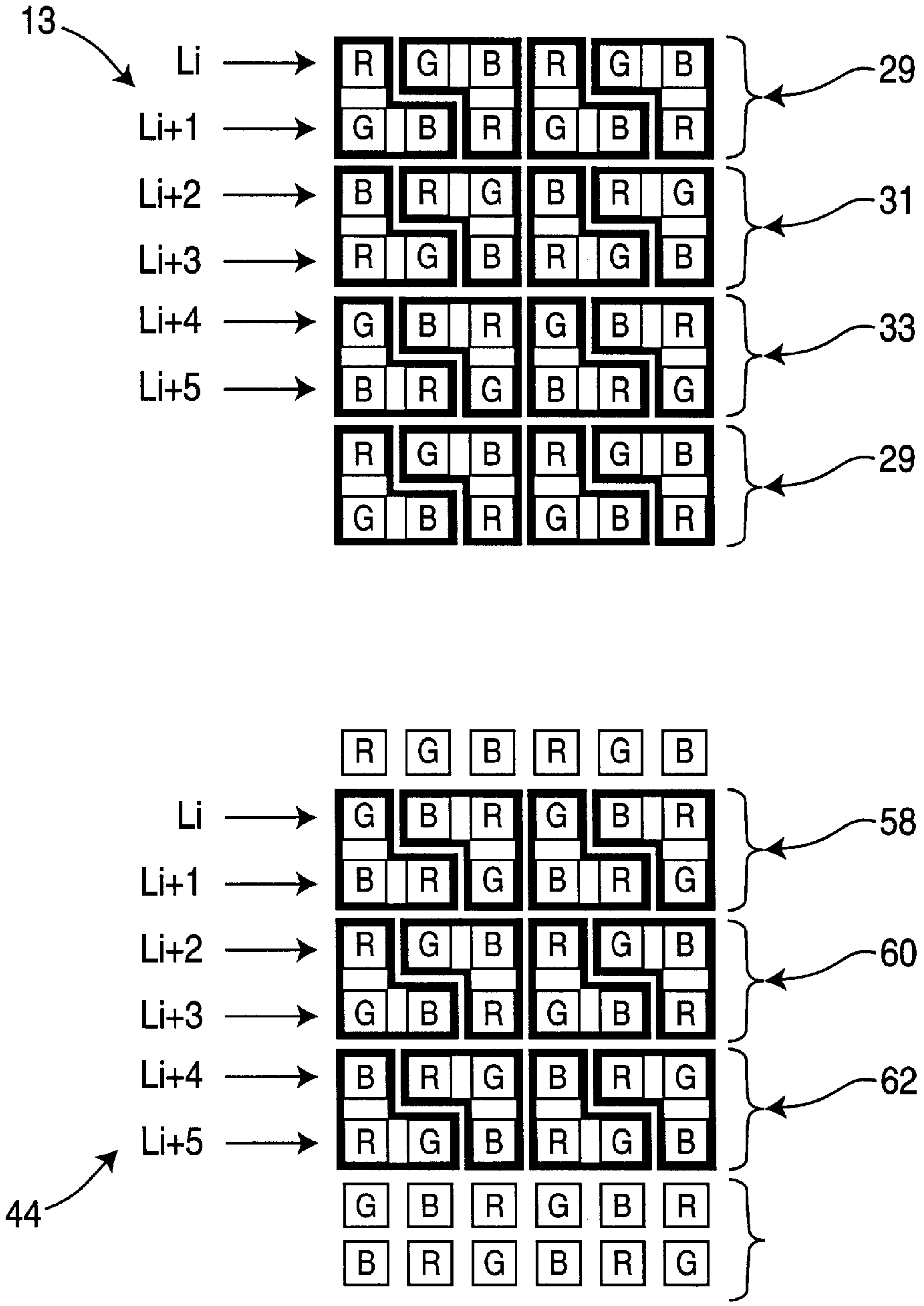
FIG. 6 illustrates a second variant of the mode of combining the subpixels R, G and B illustrated in FIG. 4.

In a fifth example of addressing, applied to a screen of the orthogonal type, illustrated by FIG. 6, for j varying periodically from 1 to M in steps of 3, and for six given physical rows Li and Li+1, Li+2, Li+3, Li+4, Li+5 situated on the odd raster 13, there are sampled:

the video signals sent to the subpixels p(i,j), p(i+1,j) and p(i+1,j+1) representing respectively the primary colours R, G and B for constituting the first displayable pixel of the odd video row 29, then the video signals sent to the subpixels p(i,j+1), p(i,j+2) and p(i+1,j+2) representing respectively the primary colours G, B and R for constituting the second pixel of the said odd video row 29, then the video signals sent to the subpixels p(i,j), p(i+1,j) and p(i+1,j+1) representing respectively the primary colours B, R and G for constituting the first pixel of the following odd video row 31, then the video signals sent to the subpixels p(i,j+1), p(i,j+2) and p(i+1,j+2) representing respectively the primary colours R, G and B for constituting the second displayable pixel of the odd video row 31, then the video signals sent to the subpixels p(i,j), p(i+1,j) and p(i+1, j+1) representing respectively the primary colours G, B and R for constituting the first pixel of the said odd video row 33, then the video signals sent to the subpixels p(i,j+1), p(i,j+2) and p(i+1,j+2) representing respectively the primary colours B, R and G for constituting the second pixel of the said odd video row 33, and for six given physical rows Li and Li+1, Li+2, Li+3, Li+4, Li+5 situated on the even raster 44, there are sampled:

the video signals sent to the subpixels p(i,j), p(i+1,j) and p(i+1,j+1) representing respectively the primary colours G, B and R for constituting the first displayable pixel of the even video row 58, then the video signals sent to the subpixels p(i,j+1), p(i,j+2) and p(i+1,j+2) representing respectively the primary colours B, R and G for constituting the second pixel of the said even video row 58, then the video signals sent to the subpixels p(i,j), p(i+1,j) and p(i+1,j+1) representing respectively the primary colours R, G and B for constituting the first pixel of the following even video row 60, then the video signals sent to the subpixels p(i,j+1), p(i,j+2) and p(i+1,j+2) representing respectively the primary colours G, B and R for constituting the second displayable pixel of the even video row 60, then the video signals sent to the subpixels p(i,j), p(i+1,j) and p(i+1,j+1) representing respectively the primary colours B, R and G for constituting the first pixel of the said even video row 62, then the video signals sent to the subpixels p(i,j+1), p(i,j+2) and p(i+1,j+2) representing the primary colours R, G and B for constituting the second pixel of the said even video row 62.

Figure 7A:
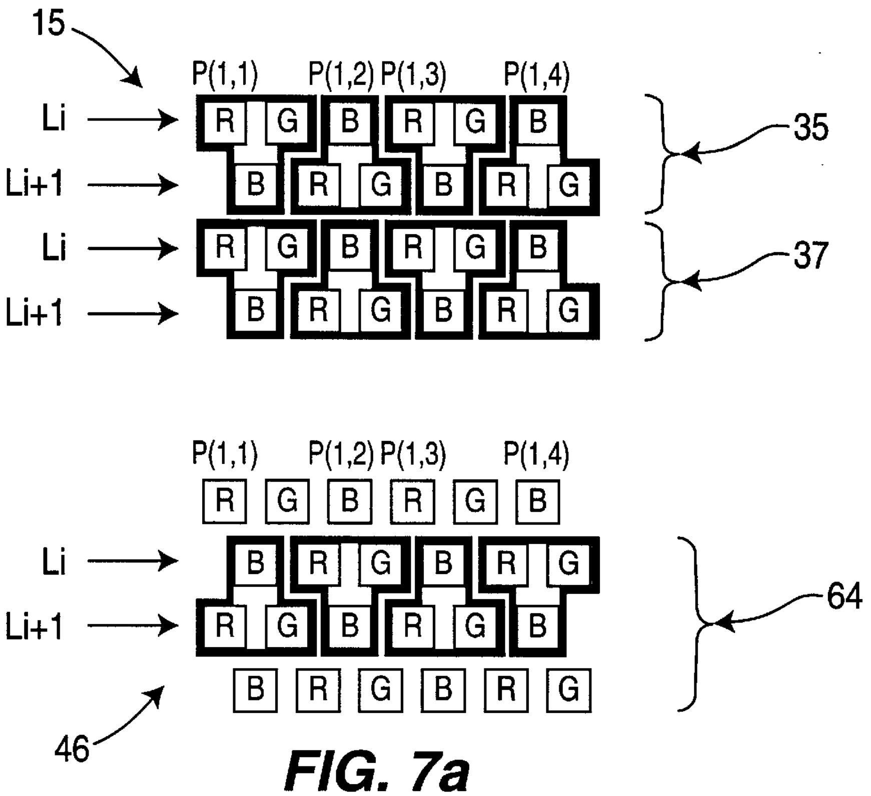
FIGS. 7*a* and 7*b* illustrate partially a third and a fourth variant of the mode of combining the subpixels R, G and B illustrated in FIG. 4 and applied to a matrix screen of the Delta type.

In a sixth example of addressing, applied to a screen of the Delta type depicted in FIG. 7*a*, in which the physical rows Li+1 are offset to the right by half a subpixel with respect to the physical rows Li, for j varying periodically from 1 to M in steps of 3, and for two given physical rows Li and Li+1 situated on the odd raster 15, there are sampled:

the video signals sent to the subpixels p(i,j), p(i,j+1) and p(i+1,j) representing respectively the primary colours R, G and B for constituting the first displayable pixel of the odd video row 35 and 37, then the video signals sent to the subpixels p(i,j+2), p(i+1,j+1) and p(i+1,j+2) representing respectively the primary colours B, R and G for constituting the following pixel of the said odd video row 35 and 37, and for two given physical rows Li and Li+1 situated on the odd raster 46, there are sampled:

the video signals sent to the subpixels p(i,j), p(i+1,j), p(i+1,j+1) representing respectively the primary colours B, R and G for constituting the first displayable pixel of the odd video row 64, then the video signals sent to the subpixels P(i,j+1), p(i,j+2) and p(i+1,j+2) representing respectively the primary colours R, G and B for constituting the following pixel of the said even video row 64.

Figure 7B:
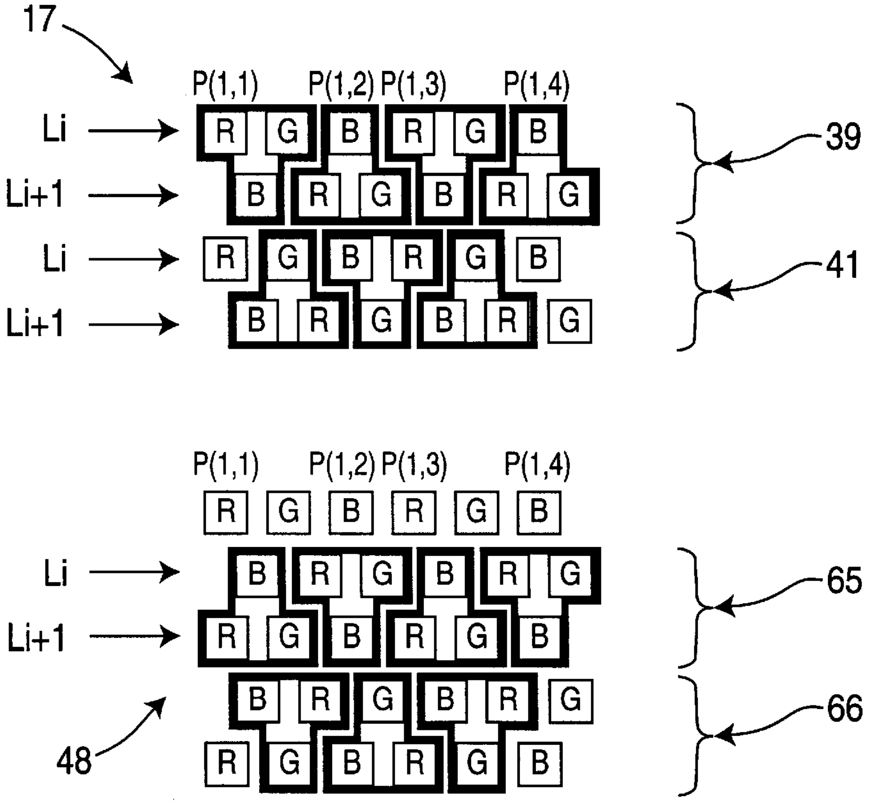

In a seventh example of addressing, applied to a screen of the Delta type depicted in FIG. 7*b*, for j varying periodically from 1 to M in steps of 3, and for two physical rows Li and Li+1 situated on the odd video raster 11, there are sampled:

the video signals sent to the subpixels p(i,j), p(i,j+1), and p(i+1,j) representing respectively the primary colours R, G and B for constituting the first displayable pixel of the odd video row 39, then the video signals sent to the subpixels p(i,j+2), p(i+1,j+1) and p(i+1,j+2) representing respectively the primary colours B, R and G for constituting the second pixel of the said odd video row 39, then the video signals sent to the subpixels p(i,j+1), p(i+1,j) and p(i+1,j+1) representing respectively the primary colours G, B and R for constituting the first displayable pixel of the odd video row 41, then the video signals sent to the subpixels p(i,j+2), p(i,j+3) and p(i+1,j+2) representing respectively the primary colours B, R and G for constituting the second displayable pixel of the odd video row 41, and for two physical rows Li and Li+1 situated on the even video raster 44, there are sampled:

the video signals sent to the subpixels p(i,j), p(i+1,j) and p(i+1,j+1) representing respectively the primary colours B, R and G for constituting the first displayable pixel of the odd video row 65, then the video signals sent to the subpixels p(i,j+1), p(i,j+2) and p(i+i,j+2) representing respectively the primary colours R, G and B for constituting the second displayable pixel of the odd video row 65, then the video signals sent to the subpixels p(i,j), p(i,j+1) and p(i+1,j+1) representing respectively the primary colours B, R and G for constituting the first displayable pixel of the odd video row 66, then the video signals sent to the subpixels p(i,j+2), p(i+1,j+2) and p(i+1,j+3) representing respectively the primary colours G, B and R for constituting the second displayable pixel of the odd video row 66.

Figure 9:
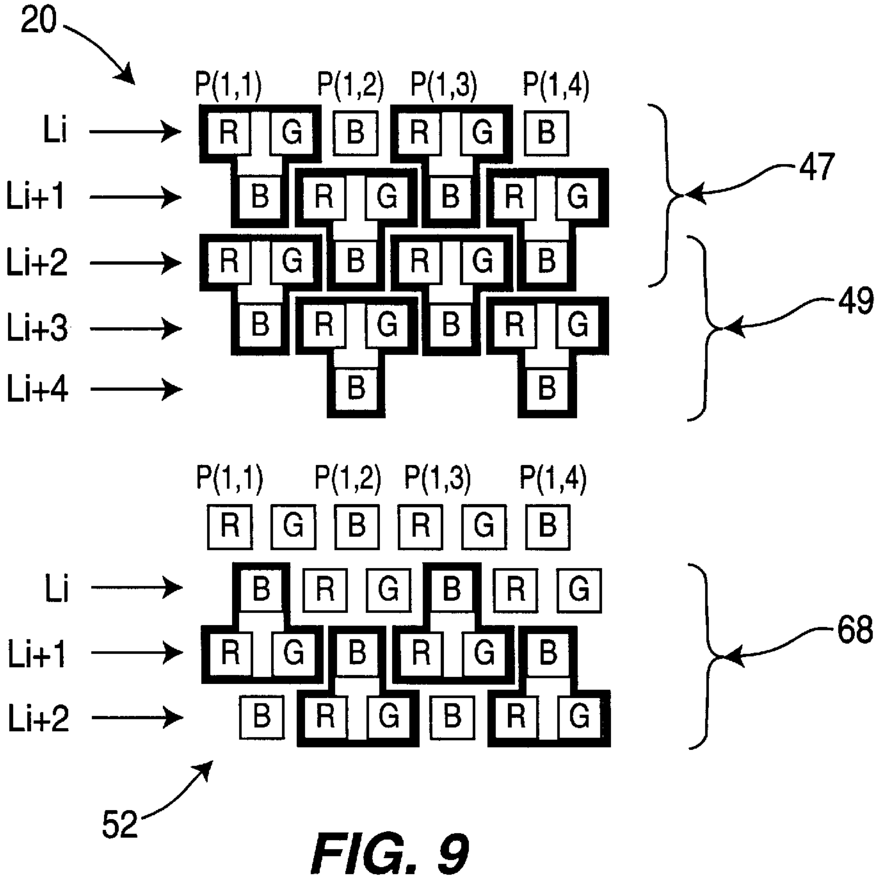
FIG. 9 illustrates partially a fifth variant of the mode of combining the subpixels R, G and B illustrated in FIG. 4 applied to a matrix screen of the Delta type.

In an eighth example of addressing, applied to a screen of the Delta type depicted in FIG. 9, for j varying periodically from 1 to M in steps of 3, and for four physical rows Li, Li+1, Li+2 and Li+3 situated on the odd video raster 20, there are sampled:

the video signals sent to the subpixels pi,j), p(i,j+1) and p(i+1,j) representing respectively the primary colours R, G and B for constituting the first displayable pixel of the odd video row 47, then the video signals sent to the subpixels p(i+1,j+1), p(i+1,j+2) and p(i+2,j+2) representing respectively the primary colours R, G and B for constituting the second pixel common to the odd video row 47, then the video signals sent to the subpixels p(i+2,j), p(i+2,j+1) and p(i+3,j) representing respectively the primary colours R, G and B for constituting the first displayable pixel of the odd video row 49, then the video signals sent to the subpixels p(i+3,j+1), p(i+3,j+2) and p(i+4,j+2) representing respectively the primary colours R, G and B for constituting the second displayable pixel of the odd video row 49, and for three physical rows Li, Li+1 and Li+2 situated on the even video raster 52, there are sampled:

the video signals sent to the subpixels p(i,j), p(i+1,j) and p(i+1,j+1) representing respectively the primary colours B, R and G for constituting the first displayable pixel of the even video row 68, then the video signals sent to the subpixels p(i+1,j+2), p(i+2,j+1) and p(i+2, j+2) representing respectively the primary colours B, R and G for constituting the second displayable pixel of the odd video row 68.

By virtue of the device according to the invention, the resolution is improved, whatever the type of screen addressed. In particular, for screens of the Delta type, the resolutions equal to M*2/3 and therefore twice the resolution obtained by the modes of addressing these screens by devices of the prior art, and the vertical resolution is equal to N/2 for strictly vertical lines and to N for diagonal lines.

What is claimed is:

1. A device for addressing a matrix screen suitable for displaying images having a plurality of video rows and columns whose constituent pixels are obtained by combining a plurality of subpixels R, G and B each receiving a luminance video signal and distributed in a network of N physical rows and M physical columns comprising:

a memory stage having a number of memories corresponding to the number of subpixels (R,G,B) and for receiving, via a demultiplexing stage, a plurality of sequences of digital data representing the previously digitized luminance video signals and delivering said luminance video signals to a multiplexing stage designed to select a sequence of digital data corresponding to a given combination of subpixels from amongst the plurality of sequences of digital data previously stored in said memory stage;

means of controlling the writing of the digital data to said memory stage memories; and means of controlling the reading of said data from said memory stage memories, wherein said write control means and read control means are connected to a first means of synchronizing the writing and reading phases, wherein each of the memories in said memory stage includes two distinct areas, comprising a first area in which there are written the digital data relating to the subpixels R, G and B of a given video row during a given writing phase, and a second area from which there are read, during said writing phase, the digital data relating to the subpixels R, G and B of a video row written during the previous writing phase.

2. A device for addressing a matrix screen suitable for displaying images having a plurality of video rows and columns whose constituent pixels are obtained by combining a plurality of subpixels R, G and B each receiving a luminance video signal and distributed in a network of N physical rows and M physical columns comprising:

a memory stage having a number of memories corresponding to the number of subpixels (R,G,B) and for receiving, via a demultiplexing stage, a plurality of sequences of digital data representing the previously digitized luminance video signals and delivering said luminance video signals to a multiplexing stage designed to select a sequence of digital data corresponding to a given combination of subpixels from amongst the plurality of sequences of digital data previously stored in said memory stage, wherein the memory stage includes two parallel branches, a first branch in which is arranged a first unit having a first cell, a second cell and a third cell intended respectively to contain the video data relating to the subpixels R, G and B situated on one of the physical rows constituting an even video row, and a second branch in which is arranged a second unit having a fourth cell, a fifth cell and a sixth cell intended respectively to contain the video data relating to the subpixels R, G and B situated on one of the physical rows constituting an odd video row.

3. The device according to claim 2, wherein the demultiplexing stage switches on the one hand the data relating to the subpixels R, G and B belonging to the odd video columns to the first unit so as to write said data, during a phase of writing a video row of duration D, respectively to the first cell, the second cell and the third cell, and on the other hand the data relating to the subpixels R, G and B belonging to the even video columns to the second unit, so as to write said data, during the writing phase, respectively to the fourth cell, the fifth cell and the sixth cell.

4. The device according to claim 3 wherein the multiplexing stage selects, at a frequency 1/D, from a date coinciding with half the duration D, a sequence of data representing the subpixels belonging to a video row to be displayed previously stored in one of the cells.

5. The device according to claim 2, further comprising:

synchronization means connected on the one hand to the demultiplexing stage and delivering to this stage a first periodic signal OW of frequency F controlling the writing of the video data relating to the subpixels R, G and B situated on an odd video column respectively to the first cell, the second cell and the third cell, and a second periodic signal EW of frequency F controlling the writing of the video data relating to the subpixels R, G and B situated on an even video column respectively to the fourth cell, the fifth cell and the sixth cell, synchronization means further connected to multiplexing stage and delivers to multiplexing stage a third periodic signal RD of frequency 2*F controlling the reading of the video data relating to the subpixels of a video row selected by the multiplexing stage.

6. A device for addressing a matrix screen suitable for displaying images having a plurality of video rows and columns whose constituent pixels are obtained by combining a plurality of subpixels R, G and B each receiving a luminance video signal and distributed in a network of N physical rows and M physical columns, comprising:

a memory stage receiving, via a demultiplexing stage, a plurality of sequences of digital data representing the previously digitized luminance video signals and delivering said video signals to a multiplexing stage for selecting a sequence of digital data corresponding to a given combination of subpixels from amongst the plurality of sequences of digital data previously stored in said memory stage;

means for controlling the writing of the digital data to said memory stage and means for controlling the reading of said data from said memory stage, said write control means and read control means connected to a first means for synchronizing the writing and reading phases, wherein said memory stage is designed to include two distinct areas, comprising a first area in which there are written the digital data relating to the subpixels R, G and B of a given video row during a given writing phase, and a second area from which there are read, during said writing phase, the digital data relating to the subpixels R, G, and B of a video row during a previous writing phase.

* * * * *